United States Patent
Nirenberg

[11] Patent Number: 6,155,195
[45] Date of Patent: Dec. 5, 2000

[54] BOAT STOWABLE TELESCOPIC STERN LIGHT

[76] Inventor: David B. Nirenberg, 4252 Tarpon Ave., Bonita Springs, Fla. 34134

[21] Appl. No.: 09/379,252

[22] Filed: Aug. 23, 1999

[51] Int. Cl.[7] .................................................. B63B 45/00
[52] U.S. Cl. ..................... 114/343; 362/477; 403/109.1
[58] Field of Search ................................... 114/343, 364; 362/459, 477, 431, 418; 403/109.1, 109.5, 110

[56] References Cited

U.S. PATENT DOCUMENTS

| | | |
|---|---|---|
| 3,253,136 | 5/1966 | Paul . |
| 3,517,184 | 6/1970 | Norton et al. . |
| 4,449,171 | 5/1984 | Warshawsky ........................... 362/431 |
| 4,856,452 | 8/1989 | Pingel et al. . |

*Primary Examiner*—Sherman Basinger

[57] ABSTRACT

A boat-stowable telescopic stern light has a telescopic rod (1) with a length lock (3) having a non-marring rod grasper (21, 22, 23, 25, 28, 30, 33) to prevent scratching or other surface damage to the telescopic rod. Length of the telescopic rod is adjustable between long enough for legal requirements of boats with lengths up to approximately thirty-nine feet and short enough to be out of the way when retracted on the boat or conveniently short for small-space storage when removed. A receptacle (6) for the telescopic rod is closable to be non-obstructive whether containing or not containing the stem light.

12 Claims, 5 Drawing Sheets

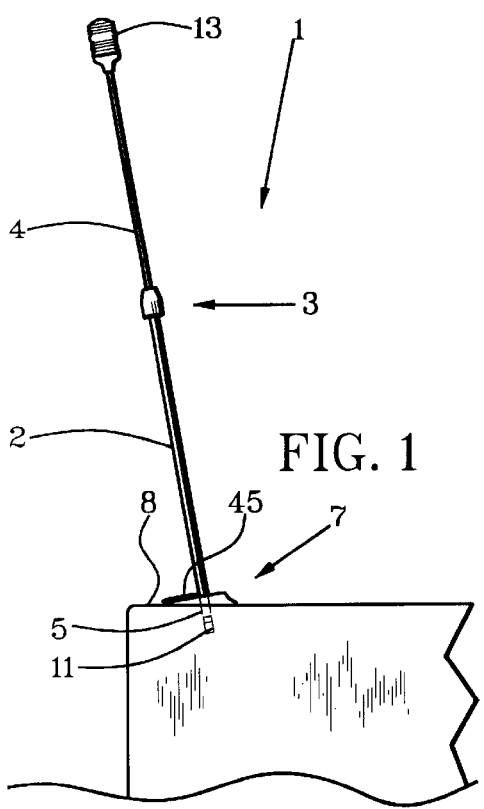
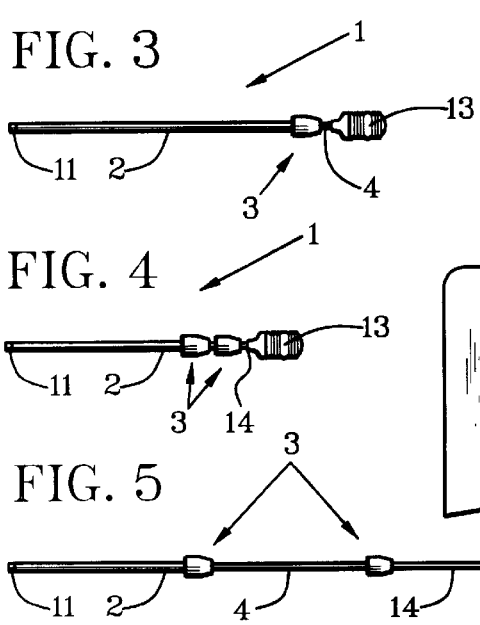
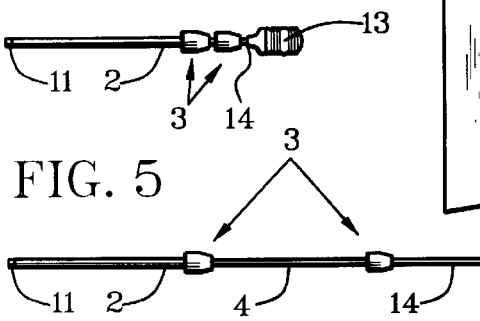
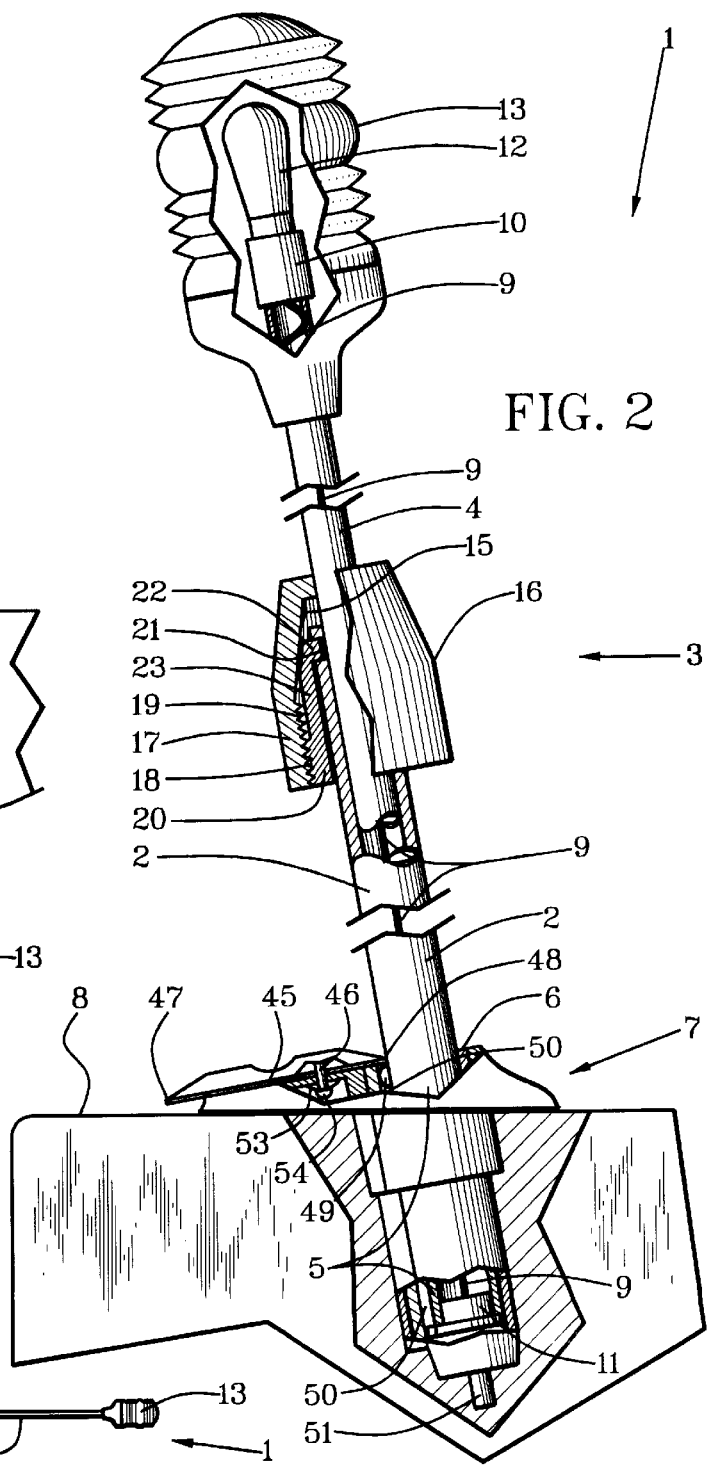

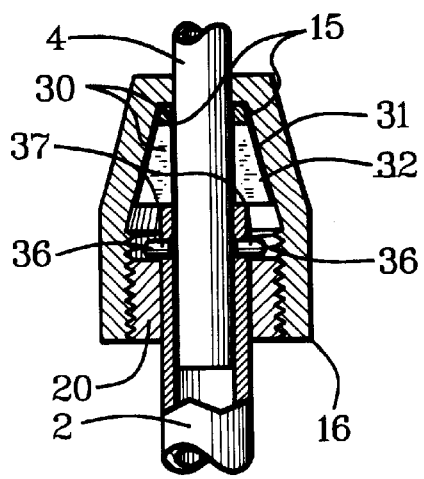
FIG. 12
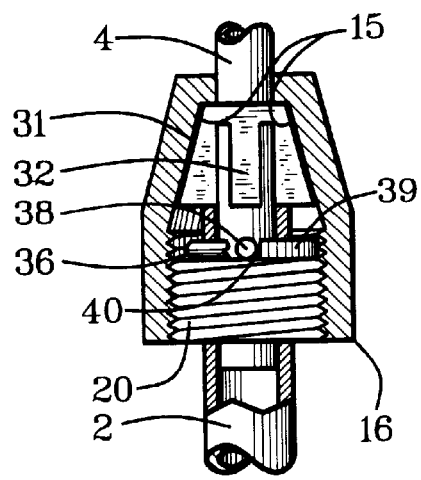
FIG. 13
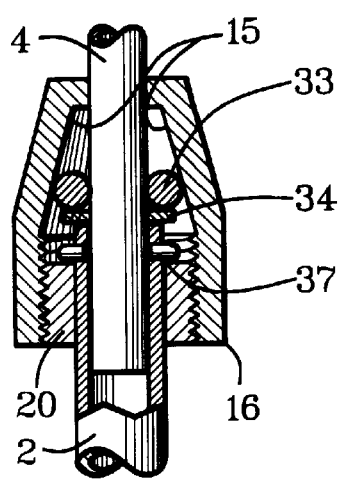
FIG. 14
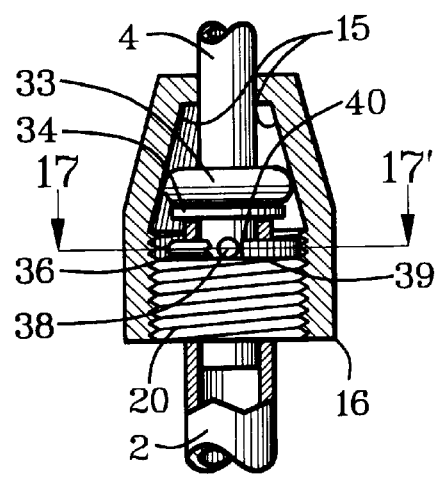
FIG. 15
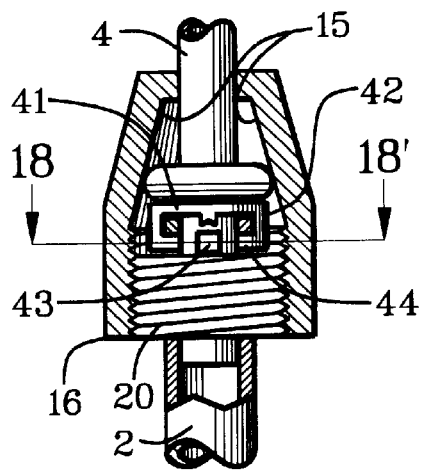
FIG. 16
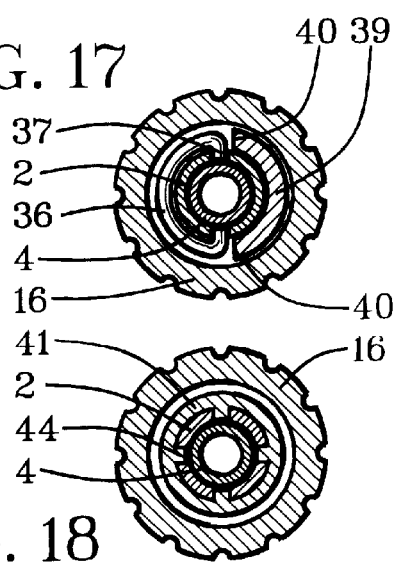
FIG. 17
FIG. 18

BOAT STOWABLE TELESCOPIC STERN LIGHT

BACKGROUND OF THE INVENTION

1. Field of the Invention

This invention relates to removably positional stern lights with telescopic support rods for non-obstruction length adjustment and for convenient storage on small boats or elsewhere.

2. Relation to Prior Art

Stern lights that are required legally for boats are often in the way when the boats are being used in the daylight for fishing, swimming and other boat-stern activities. Also, when the boats are being towed on a boat trailer or stored out of water, the stern lights can be a nuisance.

There are known stern lights that are removable and others that are telescopic in place on boats to get them down where they will be out of the way when desired. There are none known, however, that are removable and telescopically adjustable short enough to be stowed on small boats and long enough to meet legal requirements conveniently and reliably in a manner taught by this invention.

Examples of different but related stern lights are described in the following patent documents. U.S. Pat. No. 4,856,452, issued to Pingel et al on Aug. 15, 1989, described a stem light assembly that had telescopic length adjustment but was not removable and stowable on a boat. U.S. Pat. No. 3,517,184, issued to Norton et al on Jun. 23, 1970, described another stern light that also had telescopic length adjustment but was not removable and further, was limited to a particular spring type of telescopic length control. U.S. Pat. No. 3,253,136, issued to Faul on May 24, 1966, described a stem light that was removable but that was neither telescopic nor attachable removably in a manner taught by this invention. U.S. Pat. No. 994,499, issued to Bowen on Jun. 6, 1911, described yet another stern light that was telescopic but not removable.

SUMMARY OF THE INVENTION

Objects of patentable novelty and utility taught by this invention are to provide a boat-stowable telescopic stern light which:

is positional removably in a closable receptacle on a stem of a boat;

has length adjustment long enough for legal requirements and short enough to be stowed conveniently on a small boat or elsewhere when removed from a boat to avoid obstruction;

provides convenient, non-obstructive and aesthetically structural fixation of telescopic length; and has telescopic length locking that does not mar, scratch or otherwise disfigure a telescopic rod of the stern light.

This invention accomplishes these and other objectives with a boat-stowable telescopic stem light having a telescopic rod with a length lock that is convenient to operate, reliable and non-obstructive when the telescopic stem light is either positioned in a closable receptacle on a boat stem or removed to be stowed in small places on a boat or elsewhere when not in use. The length lock that has a non-marring rod grasper to prevent scratching or other surface damage to the telescopic rod. Length of the telescopic rod is adjustable between long enough for legal requirements of boats with lengths up to approximately forty feet and short enough to be out of the way when retracted on the boat or when removed for small-space storage. The closable receptacle is non obstructive when containing or not containing the stem light.

BRIEF DESCRIPTION OF DRAWINGS

This invention is described by appended claims in relation to description of a preferred embodiment with reference to the following drawings which are described briefly as follows:

FIG. 1 is a side elevation view of the boat-stowable stern light in a fully extended mode on a boat stern;

FIG. 2 is an enlarged partially cutaway illustration of a side elevation view of the boat-stowable stern light on a boat stern;

FIG. 3 is a side view of a storable mode of the FIG. 1 illustration;

FIG. 4 is a side view of a storable mode of a boat-storable stem light having three telescopic sections;

FIG. 5 is a side view of an extended mode of the FIG. 4 stern light;

FIG. 12 is a partially cutaway side view of a length lock having a conical non-marring grasper with a plurality of serrations joined at a Minor diameter of the conical non-marring grasper and having a grasper sleeve arrested on the first telescopic section with a C-ring;

FIG. 13 is the FIG. 12 illustration showing outside surfaces of the grasper sleeve and the conical non-marring grasper;

FIG. 14 is a partially cutaway side view of a length lock having a non-marring grasper that is a rubberlike O-ring and having a grasper sleeve arrested on the first telescopic section with a C-ring;

FIG. 15 is the FIG. 14 illustration showing outside surfaces of the grasper sleeve and the O-ring;

FIG. 16 is the FIG. 15 illustration with a washer retainer having arrestment appendages positioned in grasper orifices in the first telescopic section;

FIG. 17 is a cross sectional view of FIG. 15 taken through line 17–17';

FIG. 18 is a cross sectional view of FIG. 16 taken through line 18–18';

DESCRIPTION OF PREFERRED EMBODIMENT

Figure 6:
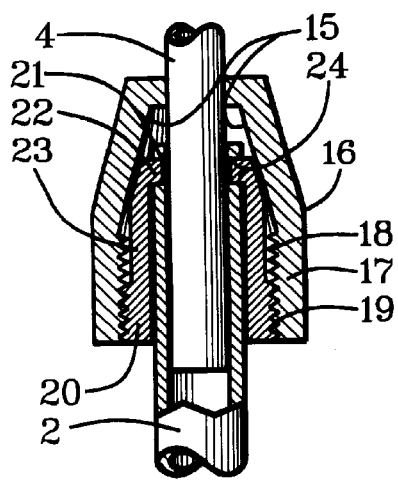
FIG. 6 is a partially cutaway side view of a length lock showing a grasper sleeve a plurality of grasper bars having grasper extensions in grasper orifices of a first telescopic section of the telescopic rod.

Listed numerically below with reference to the drawings are terms used to describe features of this invention. These terms and numbers assigned to them designate the same features throughout this description.

1. Telescopic rod
2. First telescopic section
3. Length lock
4. Second telescopic section
5. Receptacle portion
6. Closable receptacle
7. Rod retainer
8. Stern of a boat
9. Electric cord
10. Stern-light socket
11. Stern-light plug
12. Stern-light bulb
13. Stern-light illumination enclosure
14. Third telescopic section
15. Conically tapered inside periphery
16. Length-lock nut
17. Length-lock sleeve
18. Internal machine thread
19. External machine thread
20. Grasper sleeve
21. Inside grasp surfaces
22. Grasper extensions
23. Grasper bars
24. Grasper orifices
25. Conically tapered end
26. Flexible appendages
27. Inside surfaces
28. Rubberlike sleeve
29. Tapered outside periphery
30. Serrated sleeve
31. Tapered outside peripheries
32. Serrations
33. O-ring
34. O-ring washer
35. Tongue-and-groove structure
36. C-ring
37. End appendages
38. C-ring orifices
39. Arcuate ridge
40. Ridge ends
41. Retainer washer
42. Arrestment appendage
43. Washer grasper orifice
44. Washer grasper extension
45. Rotational lid
46. Lid axle
47. Orifice-cover end
48. Rod-lock end
49. Lock appendage
50. Index channel
51. Electrical connection
52. Drain orifices
53. Lid-axle spring
54. Axle buttress Reference is made first to FIGS. 1–5. A boat-stowable telescopic stem light has a telescopic rod 1 with at least a first telescopic section 2 having at least one length lock 3 with a non-marring grasper of at least a second telescopic section 4 of the telescopic rod 1. A receptacle portion 5 of the telescopic rod 1 is inserted in a closable receptacle 6 of a rod retainer 7 on a stern 8 of a boat in order to position the telescopic rod 1 of the boat-stowable telescopic stem light removably on the stem 8 of the boat. Characteristics and variants of the non-marring grasper will be described later.

As shown in FIG. 2, an electric cord 9 with a resilient-length structure intermediate a stern-light socket 10 and a stem-light plug 11 conveys current to a stem-light bulb 12 in a stern-light illumination enclosure 13.

The telescopic rod 1 has a rod-extended length intermediate a top end and a bottom end in a rod-extended mode shown in FIG. 1 for a telescopic rod 1 with two telescopic sections and shown in FIG. 5 for a telescopic rod 1 with three sections. A selectively rod-retracted mode or optionally a fully rod-retracted mode is shown in FIG. 3 for the two-section telescopic rod and in FIG. 4 for the three-section telescopic rod.

The fully rod-retracted mode of either is for removal and stowage on a boat or storage elsewhere or for leaving on the boat to be out of the way during daytime non-use. The selectively rod-retracted mode can have a selectively retracted distance that is a convenience distance intermediate the top of the stern 8 and the stern-light illumination enclosure 13 for use on particular lengths of boats. The selectively retracted distance also can include a storage distance intermediate the top of the stem-light illumination enclosure 13 and the bottom of the stern-light plug 11 with the telescopic rod 1 in a fully rod-retracted mode.

The rod-extended mode is for nighttime use on a boat having length with a legal requirement for a particular stern-light length between the stern 8 and the stern-light illumination enclosure 13.

A third telescopic section 14 can be made to relate to the second telescopic section 4 as described in relation to the first telescopic section 2.

Figure 7:
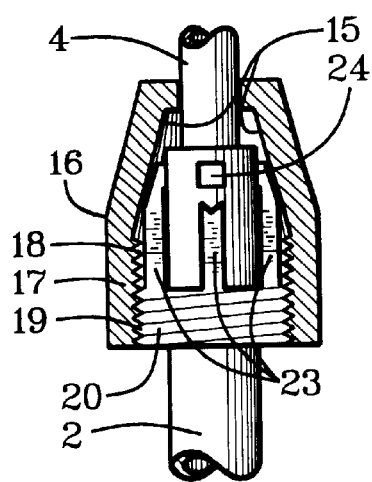
FIG. 7 is the FIG. 6 illustration showing outside surfaces of the grasper sleeve and the first telescopic section of the telescopic rod.

Referring to FIGS. 2 and 6–7, the non-marring grasper, which will be described later, has two fundamental features which include (a) at least an inside grasp surface, which also will be described later, that is softer than a surface of an outside circumferential periphery of the second telescopic section 4 of the telescopic rod 1 and (b) flexibility intermediate a conically tapered inside periphery 15 of a length-lock nut 16 and an outside circumferential periphery of the second telescopic section 4 of the telescopic rod 1. The length-lock nut 16 has a length-lock sleeve 17 with internal machine thread 18 engaged with external machine thread 19 circumferentially intermediate an inside circumferential periphery of the length-lock sleeve 17 and an outside circumferential periphery of the first telescopic section 2. The external machine thread 19 is non-rotational on or in relationship to the outside circumferential periphery of the first telescopic section 2.

The external machine thread 19 and the internal machine thread 18 have reciprocal helicoidal structure for rotation of the length-lock nut 16 in a first rotational direction to tighten the inside grasp surface of the non-marring grasper against the outside circumferential periphery of the second telescopic section 4 by circumferentially inward cam action of the conically tapered inside periphery 15 of the length-lock nut 16 against the non-marring grasper and for rotation of the length-lock nut 16 in a second rotational direction to loosen the inside grasp surface of the non-marring grasper from grasping contact with the outside circumferential periphery of the second telescopic section 4 by releasing the circumferentially inward cam action.

The external machine thread 19 can be on an outside circumferential periphery of a grasper sleeve 20 that has an inside circumferential periphery that is either on, an extension from or in contact with the outside circumferential periphery of the first telescopic section 2.

Optionally, the inside grasp surface of the non-marring grasper is a plurality of inside grasp surfaces 21 on internal ends of grasper extensions 22 that are extended radially inward from extended end portions of grasper bars 23 that are extended axially from the grasper sleeve 20 and separated circumferentially by a plurality of intervening sleeve slots. A plurality of grasper orifices 24 near a length-lock end of the first telescopic section 2 are sized, shaped and positioned to receive the grasper extensions 22 when outside peripheral edges of the grasper bars 23 are engaged by a first-directional rotation imparted to the conically tapered inside periphery 15 of the length-lock nut 16. Conversely, the inside grasp surfaces 21 are released from grasping contact by a second-directional rotation of the length-lock nut 16.

Figure 8:
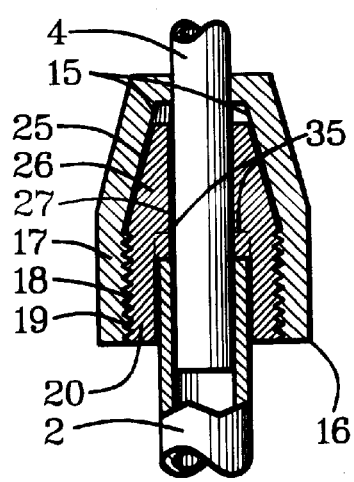
FIG. 8 is a partially cutaway side view of a length lock showing a serrated grasper sleeve with a plurality of serrations positioned circumferentially and tapered.
Figure 9:
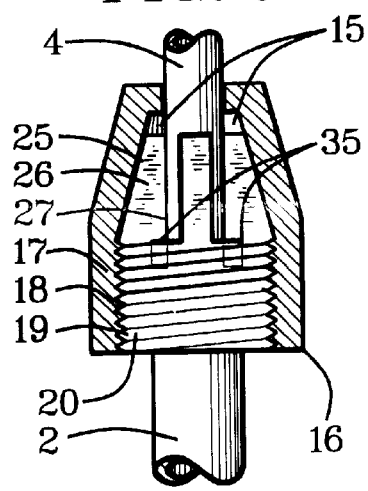
FIG. 9 is the FIG. 8 illustration showing outside surfaces of the serrated grasper.

Referring to FIGS. 2 and 8–9, the grasper sleeve 20 can be a plastic member from which a conically tapered end 25 is extended axially and has a plurality of radial slots intermediate flexible appendages 26 to allow radially bend grasping and releasing engagement of inside surfaces 27 with the outside circumferential periphery of the second telescopic section 4. This renders the inside surfaces 27 to be inside grasp surfaces and the flexible appendages 26 to be a non-marring grasper. Serrated engagement of the flexible appendages 26 with the first telescopic section 2 also can be provided for arresting rotation of the grasper sleeve on the first telescopic member 2.

Figure 10:
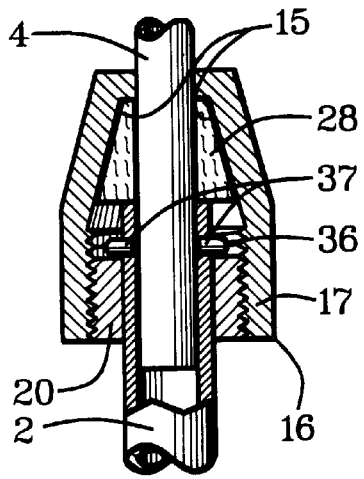
FIG. 10 is a partially cutaway side view of a length lock having a conical rubberlike non-marring grasper and a grasper sleeve arrested on the first telescopic section with a C-ring.
Figure 11:
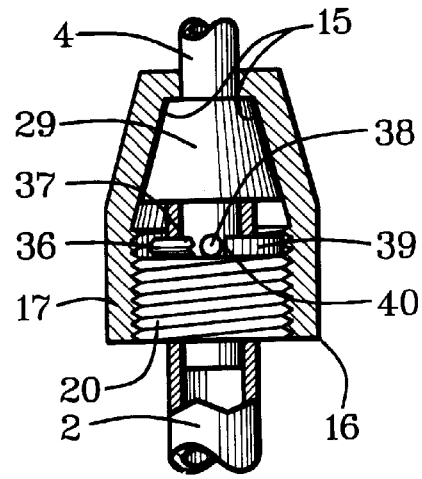
FIG. 11 is the FIG. 10 illustration showing outside surfaces of the grasper sleev/and the conical non-marring grasper.

Referring to FIGS. 2 and 10–11, the non-marning grasper can be a rubberlike sleeve 28 having a tapered outside periphery 29 that is engaged by the conically tapered inside periphery 15 of the length-lock nut 16.

Referring to FIGS. 2 and 12–13, the non-marring grasper can be a serrated sleeve 30 having tapered outside peripheries 31 of serrations 32 that can be rectangular extensions that are engaged by the conically tapered inside periphery 15 of the length-lock nut 16. Non-marring softness of inside peripheries of the serrations 32 can be plastic, soft metal, rubberlike material or other relatively soft material, almost regardless of what material is used for construction of the serrated sleeve 30.

Referring to FIGS. 2 and 14–15, the non-marring grasper can be a rubberlike O-ring 33 that is arrested axially by the first telescopic section 2 and/or an O-ring washer 34 when engaged by the conically tapered inside periphery 15 of the length-locknut 16.

Referring to FIGS. 2, 6–15 and 17, at least one rotation arrester in contact with the grasper sleeve 20 and with the first telescopic section 2 is employed to prevent or to arrest rotation of the grasper sleeve 20 from rotation of the length-lock nut 16. For the embodiment described in relation to FIGS. 2 and 6–7, the rotation arrester comprises the grasper extensions 22 inserted in the grasper orifices 24. For the embodiment described in relation to FIGS. 2 and 8–9, the rotation arrester can be tongue-and-groove structure 35 intermediate the first telescopic section 2 and the grasper sleeve 20 or an adhesive with adherence of the gasper sleeve to the first telescopic section.

The rotation arrester shown in FIGS. 10–15 and 17 is a C-ring 36 having end appendages 37 inserted in C-ring orifices 38 in the first telescopic section 2 to arrest linear or axial travel of the grasper sleeve 20. Additionally, the end sleeve 20 can have an arcuate ridge 39 with ridge ends 40 that engage the end appendages 37 of the C-ring 36 to arrest rotational motion of the grasper sleeve 20 on the first telescopic section 2 when the length-lock nut 16 is rotated. The end appendages 37 of the C-ring 36 also keep the grasper sleeve 20 on the first telescopic section 2.

The rotation arrester shown in FIGS. 16 and 18 is a retainer washer 41 positioned on a top end of the first telescopic section 2 and having at least one arrestment appendage 42 extended axially to at least one washer grasper orifice 43 in the first telescopic section 2. The arrestment appendage 42 has a washer grasper extension 44 extended radially inward for insertion into the washer grasper orifice 43.

Referring to FIGS. 2 and 19–22, the closable receptacle 6 has a rotational lid 45 positioned rotationally on a top surface of the rod retainer 7 where it is rotational on a lid axle 46 that is extended from the rod retainer 7. The rotational lid 45 has an orifice-cover end 47 and a rod-lock end 48. It is rotational a half circle on the lid axle 46 intermediate an orifice-covering mode and a rod-locking mode. The telescopic rod 1 has a lock appendage 49, such as a bolt head shown, that is extended orthogonally for locking engagement with the rod-lock end 48 of the rotational lid 45. The closable receptacle 6 has a rod-retainer sleeve with an index channel 50 in which the lock appendage 49 is positioned to align the stem-light plug 11 with electrical connection 51 on the rod retainer 7 when the telescopic rod 1 is inserted into the rod-retainer sleeve of the closable receptacle 6.

Figure 19:
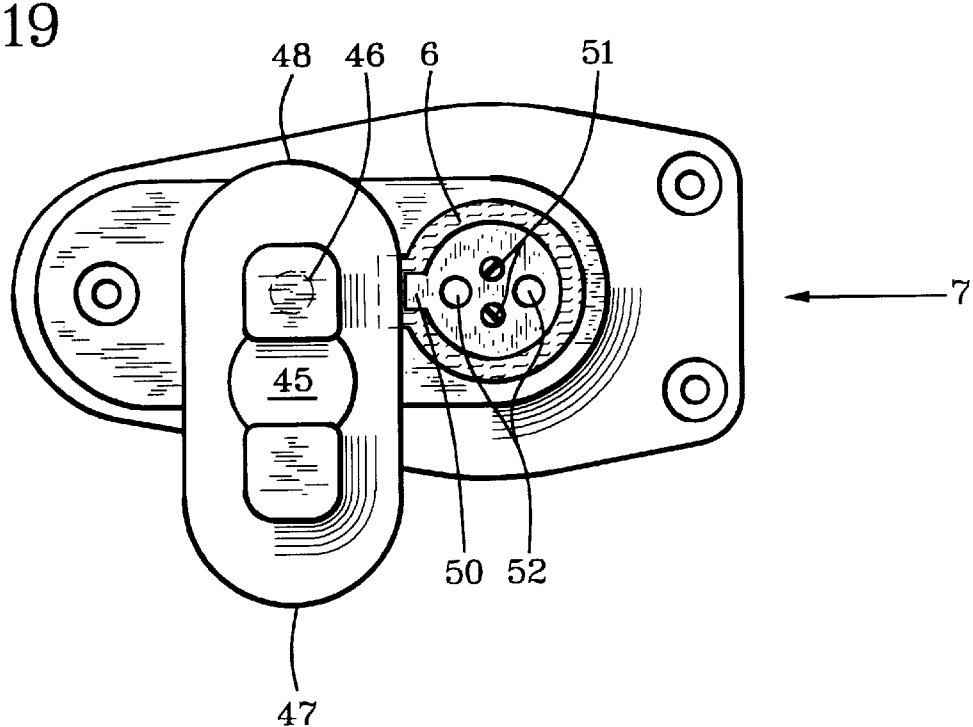
FIG. 19 is a top view of a rod retainer with a rotational lid rotated to receive telescopic rod.
Figure 20:
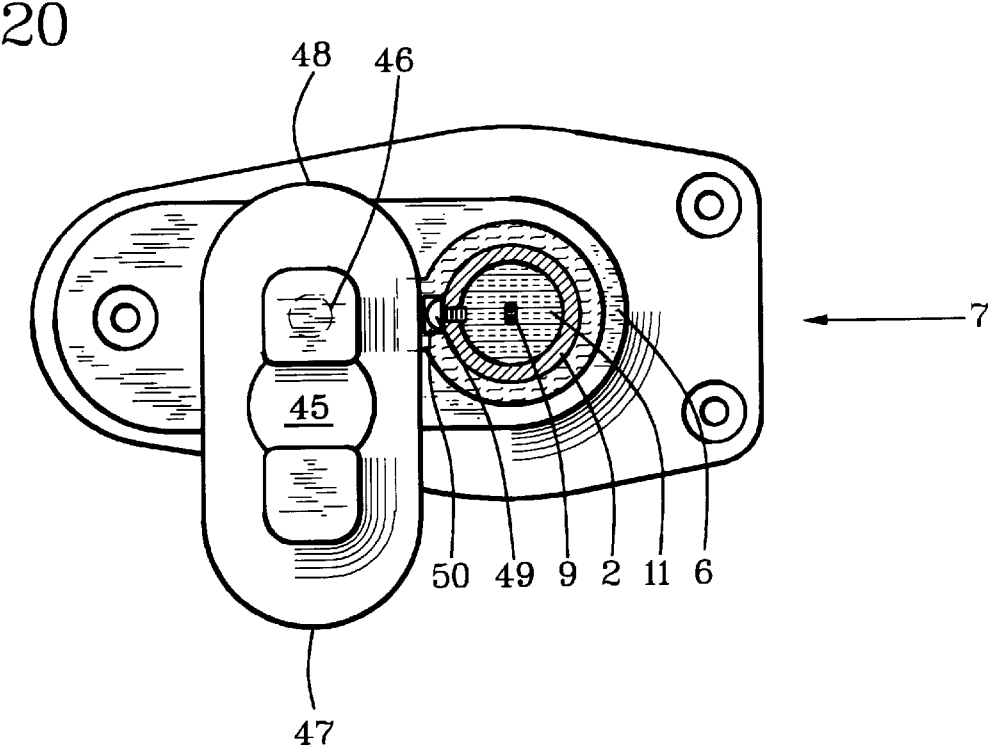
FIG. 20 is a top view of a rod retainer in which a telescopic rod is positioned with the rotational lid rotated to allow the telescopic rod to be removed.

The rod-retainer sleeve of the closable receptacle 6 preferably has drain orifices 52 in addition to the electrical connection 51 that can be seen in FIG. 19 in the absence of the first telescopic section 2 of the telescopic rod 1 that is shown inserted removably in the closable receptacle 6 in FIG. 20. The electric cord 9 can be seen centrally in the stern-light plug 11 of a first telescopic section 2 in the closable receptacle 6 with the rotational lid 45 rotated a quarter of a circle for insertion and for removal of the telescopic rod 1 in FIG. 20 and with the rotational lid 45 rotated a half of a circle to the rod-locking mode as shown in FIG. 21 with the rod-lock end 48 positioned on the lock appendage 49.

Figure 21:
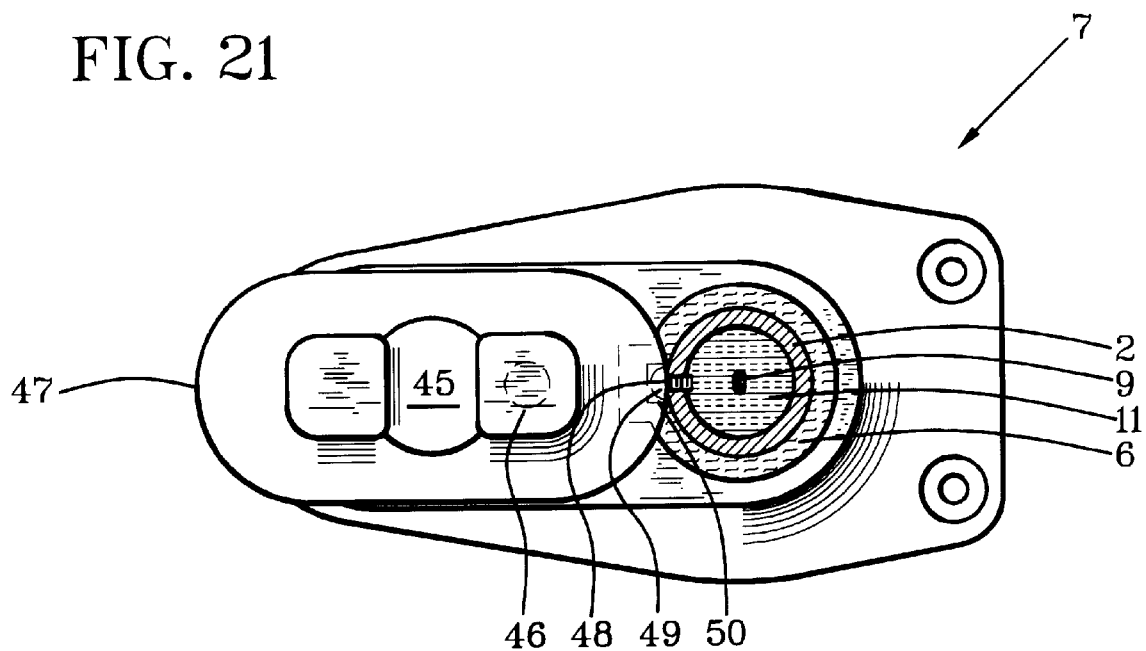
FIG. 21 is a top view of a rod retainer in which a telescopic rod is positioned with the rotational lid rotated to lock the telescopic rod in a closable receptacle the rod retainer.
Figure 22:
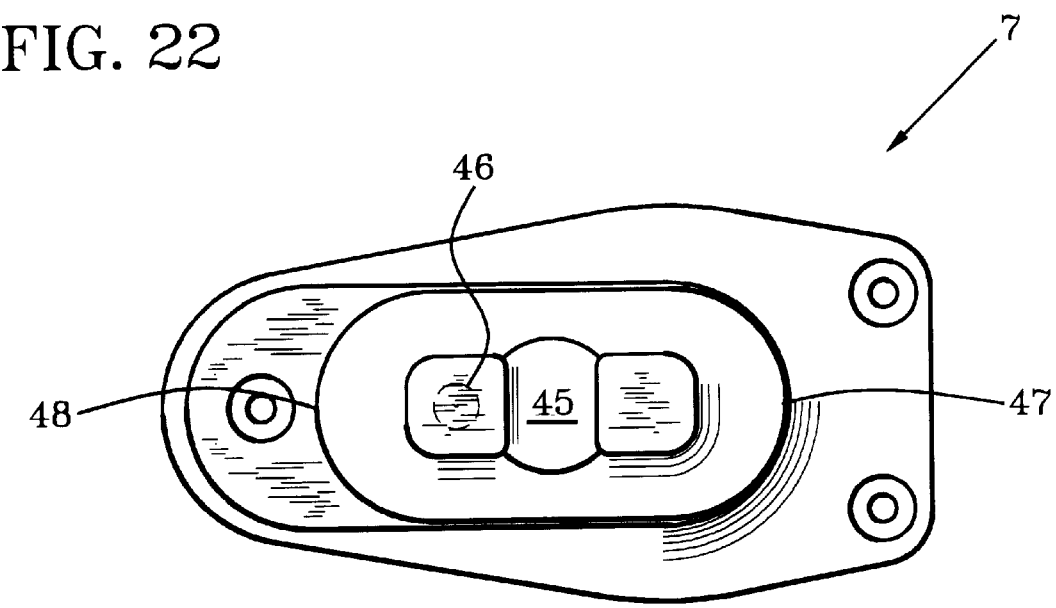
FIG. 22 is a top view of a rod retainer that is closed with the rotational lid.

As shown in FIG. 2, a lid-axle spring 53 positioned in contact with an axle buttress 54, such as an axle bolt head shown, on the lid axle 46 can be spring-pressured to force the rotational lid 45 towards the rod retainer 7 for spring-pressured positioning of the rotational lid 45 against the rod retainer 7 for snap-positioning of the rotational lid 45 in either the orifice-covering mode shown in FIG. 22 or in the rod-locking mode shown in FIG. 21 selectively.

A new and useful boat-stowable telescopic stern light having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A boat-stowable telescopic stern light comprising:

a telescopic rod having at least a first telescopic section with at least one length lock having a non-marring grasper of at least a second telescopic section of the telescopic rod;

a rod retainer positioned on a stern of the boast and having a closable receptacle in which a receptacle portion of the telescopic rod is inserted to position the telescopic rod removably on the stern of the boat;

a stern-light socket proximate a stern-light illumination enclosure on a top end of the telescopic rod;

a stern-light plug proximate a bottom end of the telescopic rod;

an electric cord with a resilient-length structure intermediate the stern-light socket and the stern-light plug;

the telescopic rod having a rod-extended length intermediate the top end and the bottom end of the telescopic rod in a selectively rod-extended mode;

the telescopic rod having a selectively rod-retracted length intermediate the top end and the bottom end of the telescopic rod in a selectively rod-retracted mode;

a light-extended mode of the stern light having a light-extended distance intermediate a top end of the stern-light illumination enclosure and a top surface of the stern with the telescopic rod in the rod-extended mode;

a light-retracted mode of the stern light having a selectively retracted distance intermediate the top end of the stern-light illumination enclosure and a bottom end of the stern-light plug with the telescopic rod in a selectively rod-retracted mode;

the light-extended distance is at least a legally required distance intermediate the top of the stern and the stern-light illumination enclosure;

the selectively retracted distance is a convenience distance intermediate the top of the stern and the stern-light illumination enclosure with the telescopic rod in the selectively rod-retracted mode;

the selectively retracted distance is a storage distance intermediate the top of the stern-light illumination enclosure and the bottom of the stern-light plug with the telescopic rod proximate a fully rod-retracted mode;

the non-marring grasper has at least one inside grasp surface;

the inside grasp surface is softer than a surface of an outside circumferential periphery of the second telescopic section of the telescopic rod;

the non-maring grasper has flexibility intermediate a conically tapered inside periphery of a length-lock nut and the outside circumferential periphery of the second telescopic section of the telescopic rod;

the length-lock nut has a length-lock sleeve with an internal machine thread engaged with external machine thread circumferentially intermediate an inside circumferential periphery of the length-lock sleeve and an outside circumferential periphery of the first telescopic section;

the external machine thread is non-rotational in relationship to the outside circumferential periphery of the first telescopic section;

the external machine thread and the internal machine thread have reciprocal helicoidal structure for rotation of the length-lock nut in a first rotational direction to tighten the inside grasp surface of the non-marring grasper against the outside circumferential periphery of the second telescopic section by circumferentially inward cam action of the conically tapered inside periphery of the length-lock nut against the non-marring grasper and for rotation of the length-lock nut in a second rotational direction to loosen the inside grasp surface of the non-marring grasper from grasping contact with the outside circumferential periphery of the second telescopic section by releasing the circumferentially inward cam action; and the external machine thread is on an outside circumferential periphery of a grasper sleeve that has an inside circumferential periphery in contact with the outside circumferential periphery of the first telescopic section.

2. A boat-stowable telescopic stern light as described in claim 1 and further comprising:

a plurality of grasper bars extended axially from the grasper sleeve and separated circumferentially by a plurality of intervening sleeve slots;

grasper extensions extended radially inward from extended end portions of the grasper bars;

a plurality of grasper orifices near a length-lock end of the first telescopic section, the plurality of grasper orifices being sized, shaped and positioned to receive the grasper extensions;

the grasper bars having outside peripheral edges that engage the conically tapered inside periphery of the length-lock nut;

the inside grasp surface of the non-marring grasper is a plurality of inside grasp surfaces on internal ends of the grasper extensions that are forced inwardly in grasping contact with the outside circumferential periphery of the second telescopic section by first-directional rotation of the length-lock nut; and the inside grasp surfaces are released from the grasping contact by second-directional rotation of the length-lock nut.

3. A boat-stowable telescopic stern light as described in claim 1 and further comprising:

at least one rotation arrester in contact with the grasper sleeve and with the first telescopic section to arrest rotation of the grasper sleeve from rotation of the length-lock nut.

4. A boat-stowable telescopic stern light as described in claim 3 wherein:

the non-marring grasper is a rubberlike sleeve positioned intermediate the grasper sleeve and the conically tapered inside periphery of the length-lock nut; and the rubberlike sleeve has a tapered outside periphery that is engaged by the conically tapered inside periphery of the length-lock nut.

5. A boat-stowable telescopic stern light as described in claim 3 wherein:

the grasper sleeve is a plastic member from which a conically tapered end is extended axially; and the conically tapered end has a plurality of radial slots intermediate flexible appendages to allow radially bend grasping and releasing engagement of inside surfaces of the flexible appendages with the outside circumferential periphery of the second telescopic section.

6. A boat-stowable telescopic stern light as described in claim 3 wherein:

the non-marring grasper is a serrated sleeve with a plurality of serrations positioned circumferentially;

the plurality of serrations in combination are tapered conically with a taper angle that is reciprocal to the conically tapered inside periphery of the length-lock nut.

7. A boat-stowable telescopic stern light as described in claim 3 wherein:

the non-marring grasper is a rubberlike O-ring positioned intermediate grasper sleeve and the conically tapered inside periphery of the length-lock nut.

8. A boat-stowable telescopic stern light as described in claim 3 wherein:

the rotation arrester is an adhesive with adherence of the grasper sleeve to the first telescopic section.

9. A boat-stowable telescopic stern light as described in claim 3 wherein:

the rotation arrester is a retainer washer positioned on a top end of the first telescopic section and having at least one arrestinent appendage extended axially to at least one washer grasper orifice in the first telescopic section; and the arrestment appendage has a washer grasper extension extended radially inward from the arrestment appendage for insertion into the washer grasper orifice.

10. A boat-stowable telescopic stern light as described in claim 3 wherein:

the rotation arrester is at least one arrestment tongue extended axially from a grasper sleeve to at least one grasper groove in the first telescopic section.

11. A boat-stowable telescopic stern light as described in claim 3 wherein:

the rotation arrester is a C-ring having end appendages inserted in C-ring orifices in the first telescopic section; and the grasper sleeve has an arcuate ridge with ridge ends of the arcuate ridge that engage the end appendages of the C-ring.

12. A boat-stowable telescopic stern light as described in claim 1 wherein:

the closable receptacle has a rotational lid positioned rotationally on a top surface of the rod retainer, the rotational lid is rotational on a lid axle that is extended from the rod retainer;

the rotational lid has an orifice-cover end and a rod-lock end;

the rotational lid is rotational a half circle on the lid axle intermediate an orifice-covering mode and a rod-locking mode;

the telescopic rod has a lock appendage extending orthogonally for locking engagement with the rod-lock end of the rotational lid;

the closable receptacle has a rod-retainer sleeve with an index channel in which the lock appendage is positioned to align the stern-light plug with electrical connection on the rod retainer when the telescopic rod is inserted into the rod-retainer sleeve;

the rod-lock end of the rotational lid is positioned on a rod-retainer side of the lock appendage by a locking rotation of the rotational lid to the rod-locking mode to retain the telescopic rod in the rod retainer;

the rod-lock end of the rotational lid is removed from the rod-retainer side of the lock appendage by an unlocking rotation of the rotational lid for release of the telescopic rod from the rod retainer and for allowing rotation of the rotational lid to the orifice-covering mode at a rotational position in which the orifice-covering portion of the rotational lid covers the rod-retainer sleeve; and a lid-axle spring positioned in contact with an axle buttress on the lid axle and spring-pressured intermediate the axle buttress and a bottom side of the rod retainer to force the rotational lid towards the rod retainer for spring-pressured positioning of the rotational lid against the rod retainer in the orifice-covering mode and in the rod-locking mode selectively.

* * * * *